（12）United States Patent
Bresch et al.

(10) Patent No.: US 7,707,194 B2
(45) Date of Patent: Apr. 27, 2010

(54) INTERFACE TO LOCK A DATABASE ROW THROUGH A LOGICAL LOCKING INTERFACE

(75) Inventors: Stefan Bresch, Offenburg (DE); Michael Watzek, Berlin (DE); Jochen Mueller, Heidelberg (DE); Guenter Zachmann, Rauenberg (DE)

(73) Assignee: SAP AG, Walldorf (DE)

( * ) Notice: Subject to any disclaimer, the term of this patent is extended or adjusted under 35 U.S.C. 154(b) by 394 days.

(21) Appl. No.: 10/864,228

(22) Filed: Jun. 8, 2004

(65) Prior Publication Data

US 2007/0198517 A1 Aug. 23, 2007

(51) Int. Cl.
*G06F 17/20* (2006.01)
*G06F 15/16* (2006.01)

(52) U.S. Cl. ..................................... 707/704
(58) Field of Classification Search ............... 707/8
See application file for complete search history.

(56) References Cited

U.S. PATENT DOCUMENTS

| | | | | |
|---|---|---|---|---|
| 5,625,815 | A | * | 4/1997 | Maier et al. ........... 707/8 |
| 6,134,594 | A | * | 10/2000 | Helland et al. ......... 709/229 |
| 6,237,043 | B1 | | 5/2001 | Brown et al. |
| 6,411,983 | B1 | | 6/2002 | Gallop |
| 6,772,155 | B1 | * | 8/2004 | Stegelmann ........... 707/8 |
| 6,971,102 | B2 | | 11/2005 | Kawachiya et al. |
| 2005/0155011 | A1 | | 7/2005 | Heik et al. |
| 2007/0118523 | A1 | | 5/2007 | Bresch et al. |
| 2007/0198517 | A1 | | 8/2007 | Bresch et al. |

OTHER PUBLICATIONS

Brown, Enterprise Java Programming with IBM WebSphere, Chapter 28 Section 12; Published: Dec. 15, 2003.*
Rankins, Microsoft SQL Server 2000 Unleashed, Second Edition, Chapter 38 Section 8; Published: Dec. 18, 2002.*
Mattila, S, *Data dictionary—what should be in it?*, May 15, 2001, pp. 4.
SQL, pp. 3.
FirstSQL, Inc., *SQL Tutorial*, 2002, pp. 16.
Notice of Allowance for U.S. Appl. No. 11/283,208 dated may 29, 2009; 11 pages.
USPTO, Non Final Office Action for U.S. Appl. No. 11/283,208 dated Nov. 26, 2007., Whole Document.
USPTO, Final Office Action for U.S. Appl. No. 11/283,208 dated May 30, 2008., Whole Document.
USPTO, Non Final Office Action dated Sep. 29, 2008., Whole Document.

* cited by examiner

*Primary Examiner*—John E Breene
*Assistant Examiner*—Alex Gofman
(74) *Attorney, Agent, or Firm*—Blakely Sokoloff Taylor & Zafman

(57) ABSTRACT

A method is described that comprises receiving at a first interface a request to lock a row of data from a database table. The method also comprises formatting the request into a format suitable for reception by a second interface. The second interface is an interface to a logical locking function.

10 Claims, 7 Drawing Sheets

FIG. 1
(PRIOR ART)

INTERFACE TO LOCK A DATABASE ROW THROUGH A LOGICAL LOCKING INTERFACE

FIELD OF INVENTION

The field of invention relates generally to the software arts; and, more specifically, to an interface to lock a database row through a logical locking interface.

BACKGROUND

Database Tables

A database typically contains a catalog that describes its various elements. The catalog divides the database into sub-databases known as schemas. Within each schema are tables. FIG. 1 shows an exemplary database table 100. A database table consists of rows $C_1$-$C_N$ and columns $R_1$-$R_N$. The columns of a table are accessed and identified by name. For example, the name for column $C_3$ might be "Phone#" and the name for column $C_6$ might be "Social Security Number".

Each column typically has a defined data type where the value for the column in each row is supposed to be of the column's defined data type (or a null). Thus, continuing with the example above, the data type for the "Phone#" column $C_3$ might be a ten digit string whereas the data type for the "Social Security Number" column $C_6$ might be a nine digit string. Each value of column $C_3$ would therefore be a ten digit number or a null value; and, likewise each value of column $C_6$ would be a nine digit string or a null value.

The primary key for a table is a designated set of one or more columns whose values are unique for each table row. As a consequence, the primary key can be used to identify a particular row. For example, assume that the table described above contained information concerning certain individuals (e.g., their salary, tax records, investment information, etc.) where a separate row was used to hold all of the data for each individual. Here, given that there exists some likelihood that two different individuals might have the same name but practically no likelihood that two different individuals will have the same phone number and social security number, columns $C_3$ and $C_6$ could be used as the primary key for the table.

That is, presenting an individual's phone number and social security number as input information to the table 100 would be sufficient to uniquely identify the row in the table where the individual's data is recorded. As such, a row in any table within an entire database can be uniquely defined by: 1) the identity of the table (i.e., the Table ID); and, 2) the row's primary key values.

Data Dictionaries and Database Software/Drivers

In the realm of enterprise software, certain software functions have evolved into significant architectural components. Two of these, the data dictionary 201 and the SQL based database interface 204 are shown in FIG. 2. A database dictionary 201 provides as an output 203 a description of the organization of a database. Included in this information would be, for example, the number of columns in a particular table, the number of rows in a particular table, which columns of the table are the primary keys, etc.

The output 203 is provided in response to some indication of the information desired. FIG. 2 shows a particular data dictionary example that provides the structure of a table (which, for example, might include a description of the column strategy $C_1$-$C_x$ as depicted in FIG. 2) in response to an input that identifies the table (i.e., the Table ID).

The database dictionary output information 203 is typically used to determine the format for a Structured Query Language (SQL) database command 206 that is provided to an SQL based database interface 204 (also referred to in the art as "database software" or a "database driver"). An SQL based database interface 204 is the communicative focal point between a database and the software users (e.g., applications, transactions, sessions, etc.) that use its information.

Frequently, an SQL command is a read that requests information from the database 205 or a write that seeks to write new information into the database 205. The SQL based database interface 204 provides a response 207 to a read in the form of the data desired and to a write, typically, in the form of an acknowledgement that the write was successful. When information within a database table is to be accessed, the SQL command used to trigger the access may be structured in a way that resembles the table's organization. Here, the information 203 provided by a data dictionary 201 may be used to help build the SQL command 206.

Logical Locking

Because two different users may simultaneously desire the same data, most database management schemes permit database data to be locked. Traditionally, locking has been "physical" in the sense that the locking is performed by the database itself.

In contrast to physical locking, logical locking is a technique in which locking is controlled at a higher level of abstraction from the physical database(s). For example, according to one type of implementation, the logical locking function is executed upon a "lock server" that controls database locking activity separately from one or more database servers. By controlling locking in a remote fashion relative to the database(s), inefficiencies associated with physical locking may be avoided.

For example, logical locking should allow for better cohesiveness of software that depends upon databases having disparate physical locking characteristics (e.g., where a first database is able to lock a single row and another database is only able to lock a group of rows). The abstract remoteness of logical locking (with respect to physical locking) may also permit items other than database entries to be locked. For example, in an object-oriented environment, data objects having no relationship to any database could conceivably be locked (as well as database entries as described above). Moreover complex locking relationships may be implemented. For example, if an object that represents "an order" is to be locked, all other objects that represent items in the order may be automatically locked in response.

FIG. 3 shows a prior art logical locking interface 301. An interface (such as an Application Programmer's Interface (API)) is a defined set of inputs (e.g., commands, parameters, etc.) to a first software function that can be invoked by a second software function so that the second software function can use the first software function. Software interfaces also typically provide for the presentation of output information that is responsive to one or more of the inputs.

As described in more detail below, the information that is to be locked is defined at the logical locking interface 301 along with a request to lock it. The functionality behind the logical locking interface 301 (i.e., the software function that the logical locking interface 301 serves as a user interface for) analyzes each lock request and grants/rejects each lock request for a data item based upon the non-existence/existence of a lock for the same item of data.

The logical locking interface 301 of FIG. 3 has a name input 302 and an argument input 303. The name input 302 identifies "the owner" of the item of data for which a lock is being requested. The argument input 303 identifies the item of data that a lock is being requested for. The functionality behind the locking interface is "name based" in the sense that every data item that is capable of being locked is assumed to belong to an owner having a specific name. For example, if a data field within an object is to be locked, the name input 302 would identify the object and the argument input would identify the data field. In the case of a database row and column pair, the name input 302 would identify the table and the argument input 302 would identify the row and column.

The logical locking interface 301 also has a mode input 304, a lifetime input 305, a timeout input 306, and an asynchronous input 307. Each of these are described in detail immediately below.

The "mode" input 304 can specify any of the following: 1) SHARED for a read lock; 2) EXCLUSIVE for a write lock; 3) EXCLUSIVE_NON_CUMULATIVE for a write lock; 4) OPTIMISTIC for a read lock; or, 5) OPTIMISTIC_TO_EXCLUSIVE for a write lock. A description of each follows immediately below.

If a data item is experiencing a SHARED read lock by a user, other users can be given a read lock to the same data item—but—no user will be given a write lock to the data item. If a data item is experiencing an EXCLUSIVE write lock by a user other users are not given a read lock or a write lock to the data item. Cumulative means that, if a user requests an EXCLUSIVE lock for a data item that the user has already been granted an EXCLUSIVE write lock for, no "exception" will be thrown. NON CUMULATIVE means that an exception will be thrown if a user requests an EXCLUSIVE lock for a data item that the user has already received an EXCLUSIVE lock for.

An exception is a formal rejection to a lock request. Exceptions help to avoid deadlock situations. If two applications request exclusive locks for the same two data items in a different order (e.g., a first application requests item A and then item B and second application first requests item B and then item A), there might be a deadlock of these two applications. Deadlocked applications cannot proceed because, in order to proceed, they each simultaneously need access to the data that is locked by the other. In a deadlock situation, one of these applications could be stopped automatically by the application server or manually by an administrator.

To avoid such a situation, an exception is thrown if a read or write lock request cannot be granted. In response to the receiving of an exception from the logical locking interface (as a response to a read or write lock request), a user may again retry the lock request again after a short time. If the lock is still not granted, the user can retry repeatedly.

According to the OPTIMISTIC read mode, a read of the data is permitted but it is not guaranteed to be consistent with the database because other users may also be reading the same data with the intent to update (i.e., change) it. In OPTIMISTIC read locking, the first user to update the contested data "wins" because only that user is guaranteed to be consistent with the database. As such, the first "winning" user must have "propagated" the original OPTIMISTIC read into an EXCLUSIVE write. The OPTIMISTIC_TO_EXCLUSIVE mode is used for this purpose. That is, the OPTIMISTIC_TO_EXCLUSIVE mode is used when an attempt is made to update a data element that was read optimistically.

The "lifetime" input 305 specifies whether the data item is to be locked for the lifetime of a communication session; or, a transaction (local or distributed). The timeout input 306 specifies the amount of time that the logical locking interface will repeatedly try to lock a data item that, so far, has been locked by another user. Once this foreign lock is released, the lock is granted to the calling user. If the time amount given by the timeout parameter has been exceeded and the lock has not been granted to the calling user, an exception will be thrown. Therefore, a lock request call to the logical locking interface blocks the calling user until the lock is granted or the timeout time has been exceeded.

Although only locking has been discussed above, treatment as to the manner in which data items are "unlocked" can also be specified through the interface 301. According to one implementation, if the asynchronous input 307 is set to "false", locks for a transaction or user session are released synchronously (e.g., a lock server blocks until all locks are released). By asserting the asynchronous input 307 to "true" asynchronous releases are attempted (but cannot be guaranteed).

A problem is that because the logical locking function behind the interface 301 is geared toward "something more" than traditional physical locking, detrimental effects may result if the logical locking function is used to lock an entire row of data. For example, if different users specify the row columns according to different syntaxes, the functionality behind the interface 301 might "miss" the conflict and permit overlapping requests to access the same data.

SUMMARY

A method is described that comprises receiving at a first interface a request to lock a row of data from a database table. The method also comprises formatting the request into a format suitable for reception by a second interface. The second interface is an interface to a logical locking function.

FIGURES

The present invention is illustrated by way of example and not limitation in the figures of the accompanying drawings, in which like references indicate similar elements and in which:

FIG. 1 (prior art) shows an embodiment of a database table;

DETAILED DESCRIPTION

Figure 4:
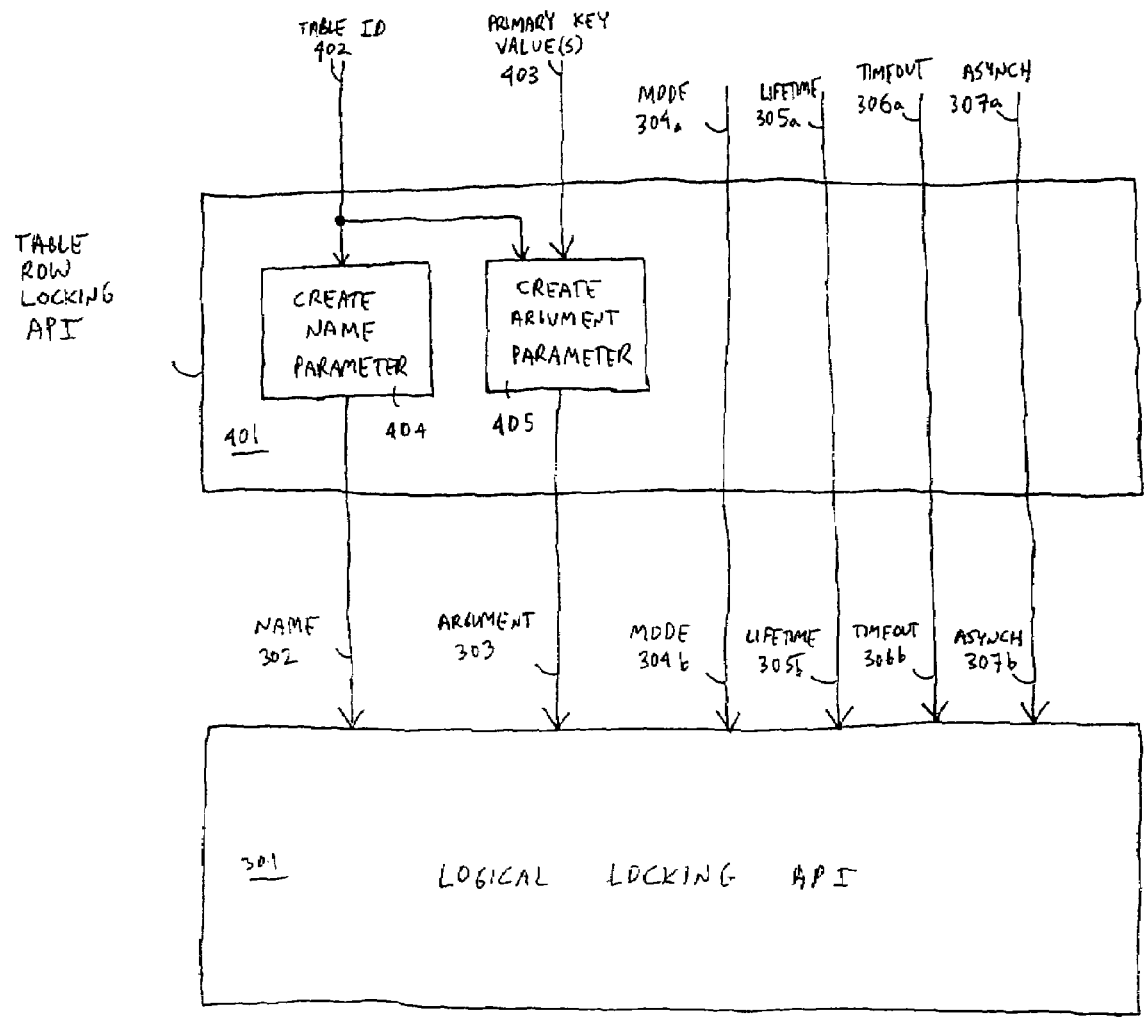
FIG. 4 shows an interface for generating a database table row lock request through a logical locking interface.

Formatting requests to lock an entire row of a database table into a standard format for submission to a logical locking interface should help the functionality behind the logical locking interface service such requests. FIG. 4 shows an architecture in which another interface (the table row locking interface) 401 used to format requests to lock an entire row of database data is positioned "on top of" a logical locking interface 301.

The table row locking interface 401 formats user requests to lock a row of data from a database table into a standard format that allows the functionality behind the logical locking interface 301 to better handle such requests. According to the stacked interface structure observed in FIG. 4, the table row locking interface 401 also has mode 304a, lifetime 305a, timeout 306a and asynchronous 307a inputs. Moreover, the embodiment of FIG. 4 shows that these inputs 304a through 307a are respective "straight-throughs" to the mode 304b, lifetime 305b, timeout 306b and asynchronous 307b inputs of the logical locking interface 301.

Figure 2:
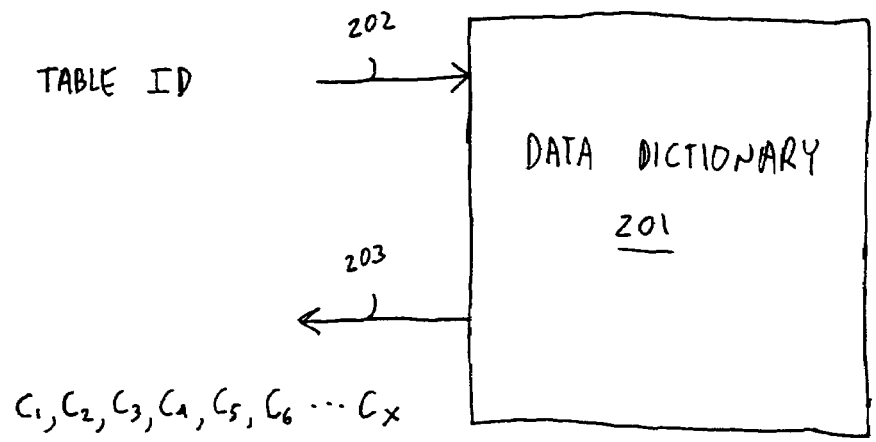
FIG. 2 (prior art) shows an embodiment of a data dictionary and an SQL based database interface.
Figure 2:
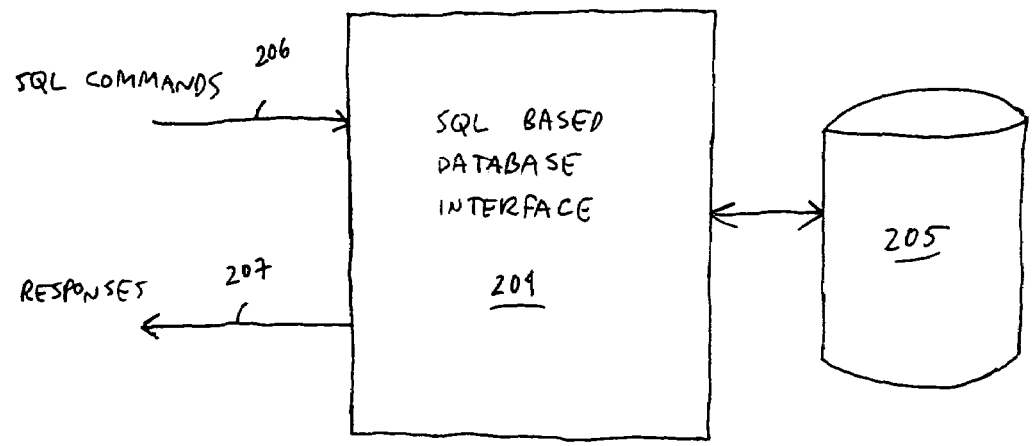
Figure 3:
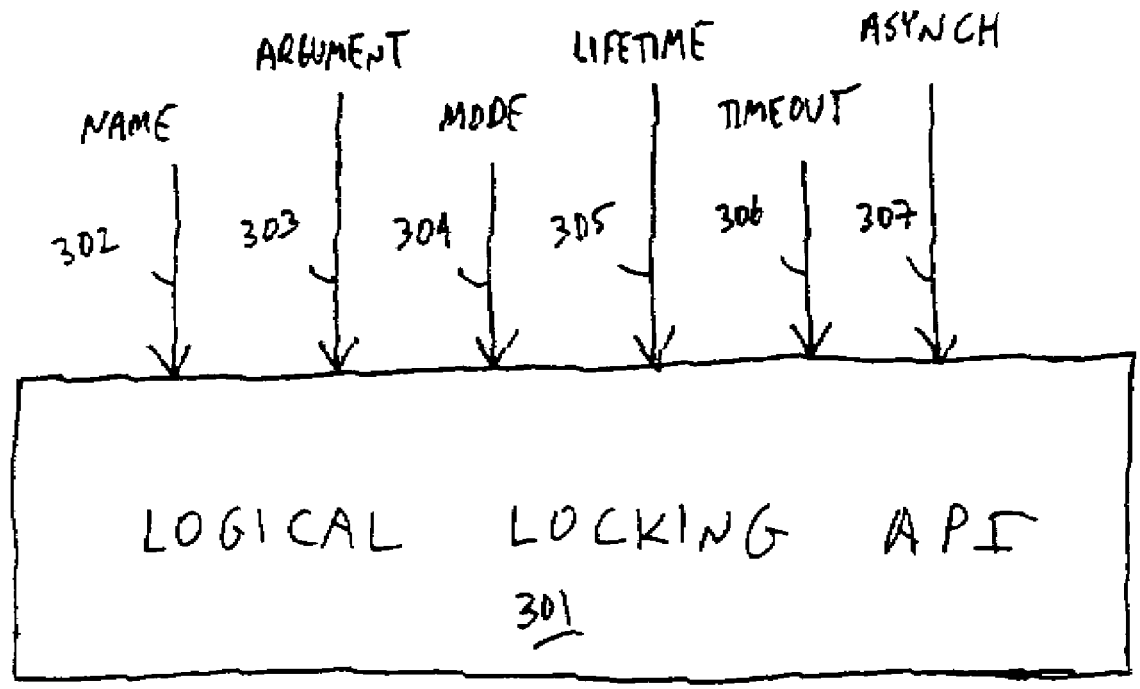
FIG. 3 (prior art) shows a logical locking interface.

That is, an input parameter received at any of inputs 304a through 307a of the table row locking interface is simply passed through to inputs 304b through 307b, respectively, of the logical locking interface 301. In an embodiment, the mode 304b, lifetime 305b, timeout 306b and asynchronous 307b inputs of the logical locking interface 301 of FIG. 4 are the same as those described above with respect to FIG. 3. As such, the structure of FIG. 4 indicates that the table row locking interface 401 accepts inputs for (and the functionality behind the table row locking interface 401 supports) the same functions described with respect to inputs 304 through 307 of FIG. 3.

Figure 5:
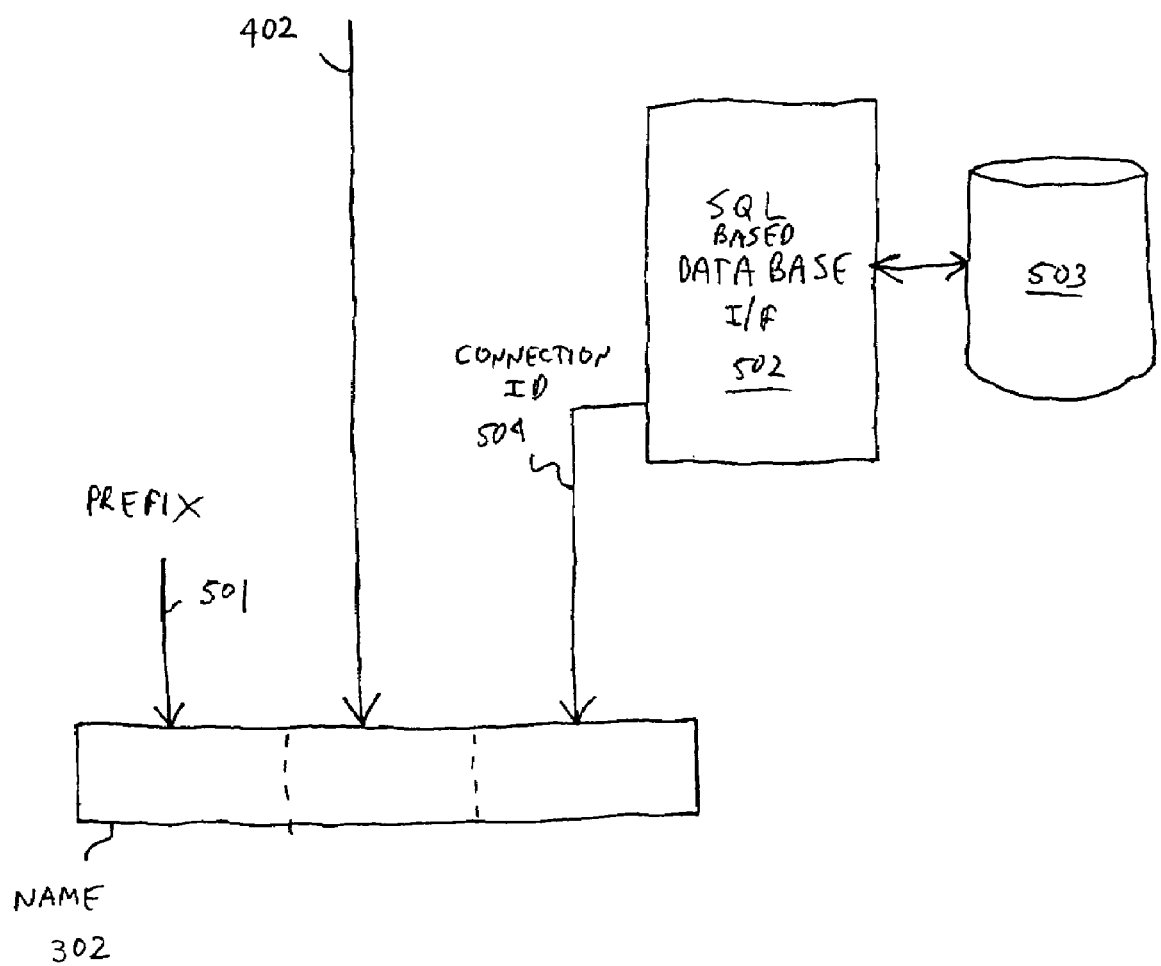
FIG. 5 shows a methodology for generating a name input to the logical locking interface as part of the above mentioned request.

The table row locking interface 401 also formats 404 an identification of the table 402 having the row to be locked into a name parameter input 302 for presentation to the logical locking interface 301; and, formats 405 primary key values 403 that identify the row to be locked into an argument parameter input 303 for presentation to the logical locking interface. FIG. 5 discusses an embodiment of the name formatting method 404 and FIG. 6 discusses an embodiment of the argument formatting method 405. Each of these are discussed in more detail immediately below.

According to the depiction of FIG. 5, the name parameter that is formed by the name formatting process has three components: 1) a first component that is a prefix 501 that signifies to the logical locking interface 301 that the request is being issued from the table row locking interface 401; 2) a middle component that is an identification of the table 402; and, 3) a last component that is an identification 504 of a connection to the database having the table whose row is to be locked.

Use of the prefix 501 helps to avoid conflicts with other users of the logical locking interface. Specifically, it informs the logical locking interface 301 that the response to the request should be directed to the table row locking interface 401. In turn, the table row locking interface relays the response to the user that presented the request to the table row locking interface.

The table identification 402 identifies the table having the row to be locked. The connection identification 504 identifies the database schema having the table whose row is to be locked. This information is included in case there exists two tables (in different schema) having the same name. As such, inclusion of the connection identification 502 The connection identification 504 is retrieved from a SQL based database interface 502.

In an embodiment, the size of the name input 302 to the logical locking interface is of a fixed length. As such, in order to fit the information of all three components 501, 402, 504 into the name input 302, rather than using the full connection id value, a Base64 representation of the hash code of the full connection identification for the given connection is used for the last component. In a further embodiment, the size of each of the three components within the name input 301 is fixed. In some cases the full identification of the table is of a larger size than the fixed space reserved for it in the middle of the name input 301. If so, a Base64 representation of the hash code of the portion of the table information that does not fit in this fixed space is placed in a region of the name input 301 that resides at the end of this fixed space.

Figure 1:
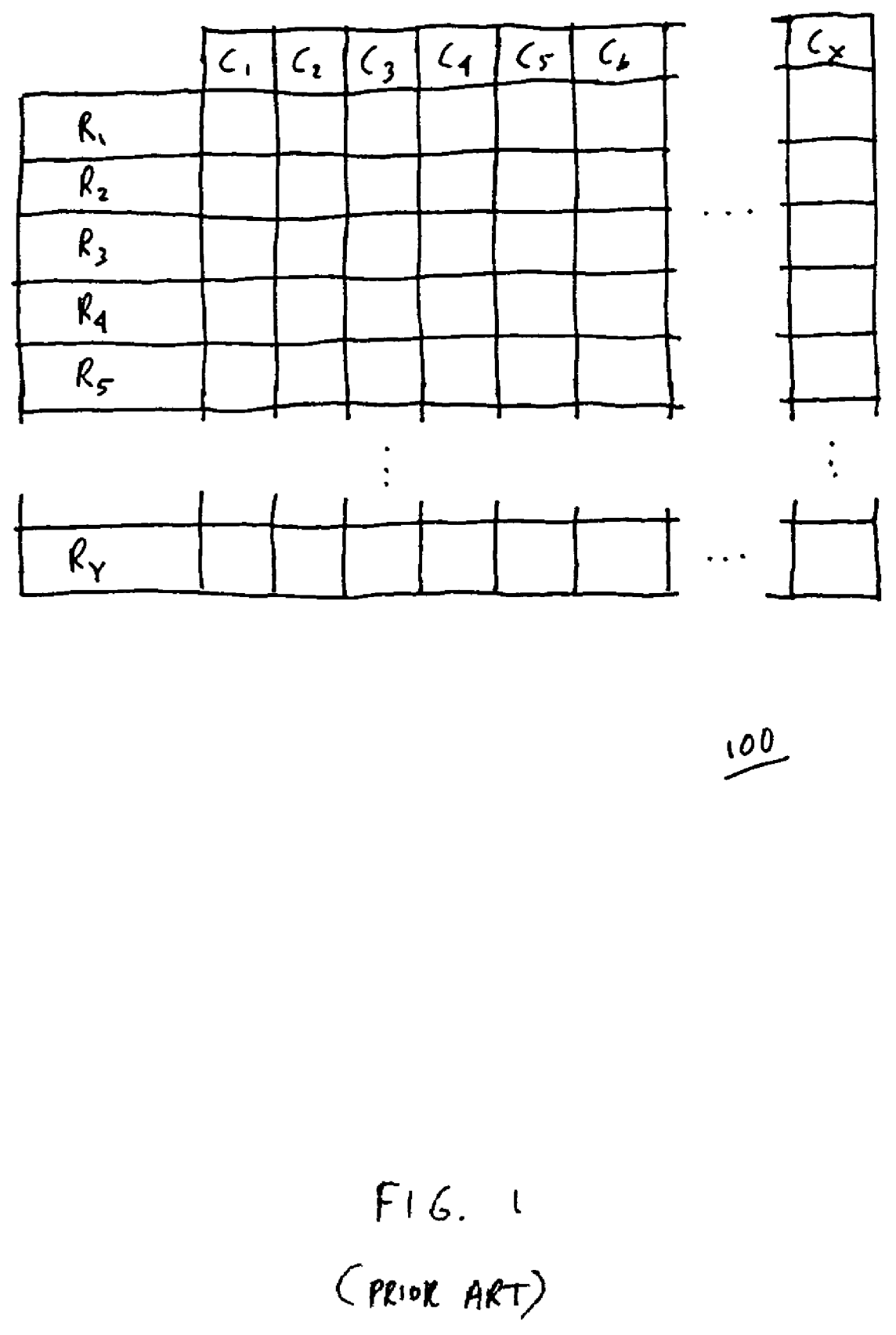
Figure 6:
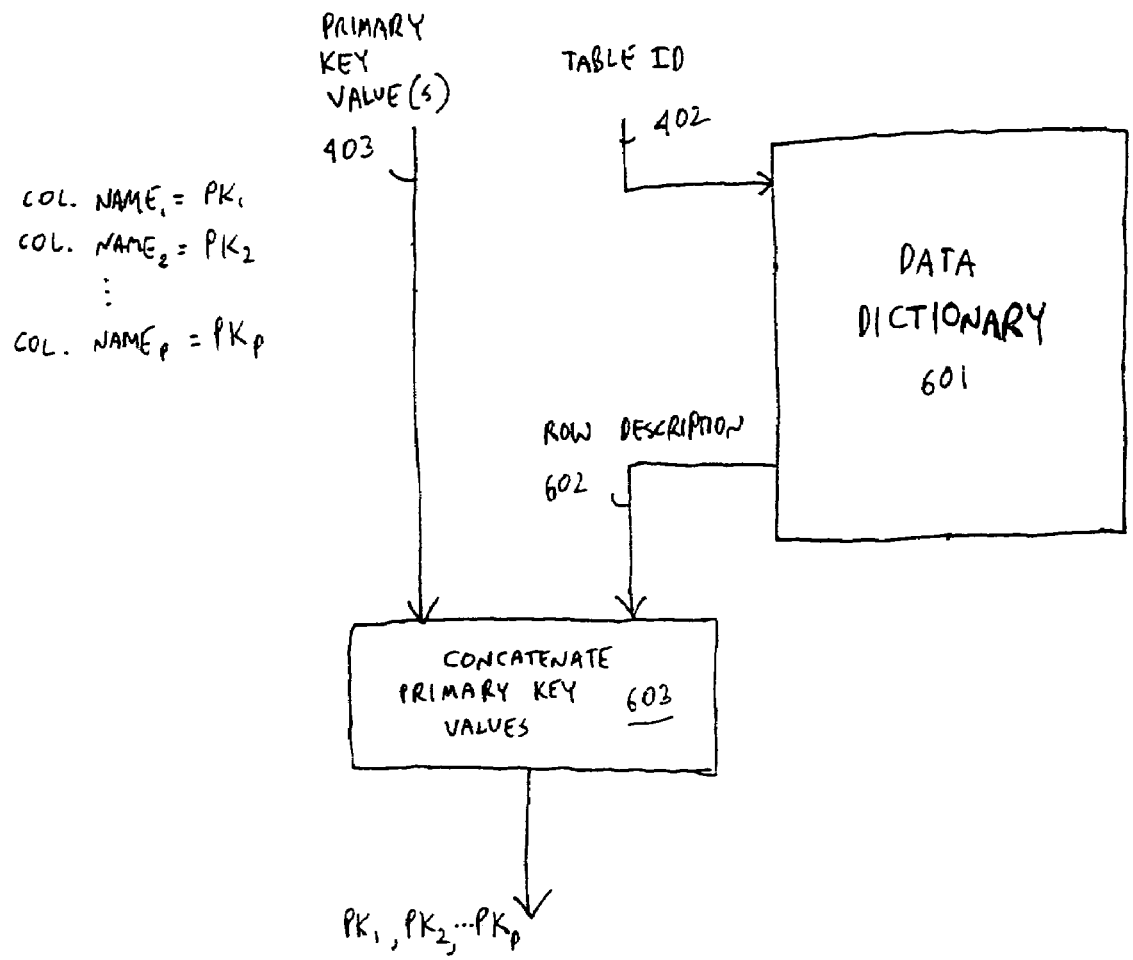
FIG. 6 shows a methodology for generating an argument input to the logical locking interface as part of the above mentioned request.

According to the depiction of FIG. 6, the argument 303 is formatted by concatenating the values of the targeted row's primary key (if the table row's primary key of formed from more than one of the table's column). As an example, if the targeted row is assumed to have X columns whose primary key corresponds to columns 3 and 6 (e.g., as described in the background with respect to FIG. 1), the information provided to the logical locking interface 301 is simply an ordered listing of the primary key values $PK_1$, $PK_2$ (e.g., a value from a particular column is listed before all values listed from columns on its "right").

In an embodiment, the user provides the primary key column names along with the primary key values $PK_1$, $PK_2$. Information describing the structure of the table row to be locked is provided by a data dictionary 601 (e.g., in response to the identification of the table 402 that has the targeted row). From this information, primary key column name is correlated to table column position so that the proper order of primary key values can be determined. In a further embodiment, similar to the name parameter, the size of the argument parameter is fixed resulting in the use of hash codes for primary key values that are too large to fit into the argument parameter. In one embodiment, the argument is 150 characters long; and, if the primary key values are sufficient to exceed this length; then, the portion extending beyond position 144 is used to generate a Base64 hash code that fills spaces 145 through 150.

More than one row may be locked by submitting substantive values for less than all of the primary key columns and null values for the remaining primary key values. Such a submission will be interpreted by the logical locking interface as a request to lock all rows having data that matches the substantive primary key values (i.e., less than all of the primary key columns can be used to identify a group of rows rather than a single row).

It is important to emphasize that the processes described above may be executed upon a computing system such as a server. The server may be Java 2 Enterprise Edition ("J2EE") server nodes which support Enterprise Java Bean ("EJB") components and EJB containers (at the business layer) and Servlets and Java Server Pages ("JSP") (at the presentation layer). Of course, to the extent possible, other embodiments may be implemented in the context of various different software platforms including, by way of example, Microsoft .NET, Windows/NT, Microsoft Transaction Server (MTS), the Advanced Business Application Programming ("ABAP") platforms developed by SAP AG and comparable platforms.

Processes taught by the discussion above may be performed with program code such as machine-executable instructions which cause a machine (such as a "virtual machine", general-purpose processor or special-purpose processor) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 7:
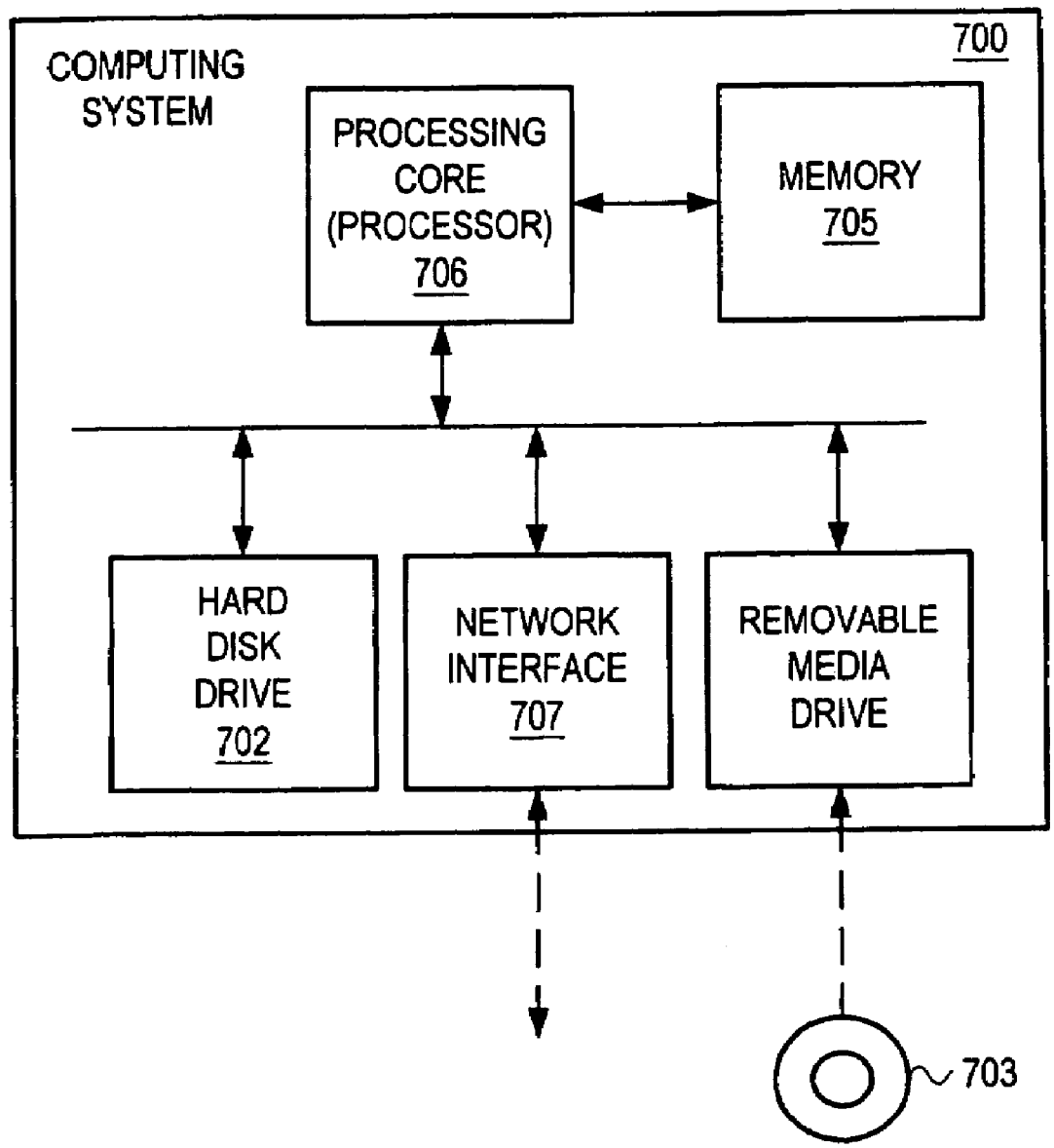
FIG. 7 shows a computing system.

FIG. 7 is a block diagram of a computing system 700 that can execute program code stored by an article of manufacture. It is important to recognize that the computing system block diagram of FIG. 7 is just one of various computing system architectures. The applicable article of manufacture may include one or more fixed components (such as a hard disk drive 702 or memory 705) and/or various movable components such as a CD ROM 703, a compact disc, a magnetic tape, etc. In order to execute the program code, typically instructions of the program code are loaded into the Random Access Memory (RAM) 705; and, the processing core 706 then executes the instructions.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
reading program code from a memory and processing said program code with a processing unit to perform the following:
receiving at a first application programming interface (API) a lock request requesting a lock and identifying an amount of data in a table of a database server for which the lock is requested, wherein said lock request is read lock request, the receiving including receiving an indication that said row of data is to be shared with other read locks during said read lock and that said read lock is to be optimistic, the lock request to be serviced by a logical locking function remote from the database server, the logical locking function including a second API, the lock request received at the first API in a first format including an identifier of the table and primary key information identifying a row of data in the table, the primary key information including values for each of two or more columns of the table, wherein the values are ordered according to a first order;
in response to the receiving the lock request, the first API converting said received lock request from the first format into a second format suitable for reception by the second API, said converting comprising:
creating a first parameter for said second format by combining an identifier of said first API and an identifier of said database table,
the first API retrieving from a database dictionary data describing a structure of the row of data, the retrieving based on the identifier of the table in the received lock request, and
creating a second parameter for said second format, the second parameter including the values for each of the two or more columns included in the received lock request, wherein the values for each of the two or more columns are reordered and concatenated in the second parameter according to a second order of the retrieved data describing the structure of the row of data, the second order different from the first order; and
sending said converted lock request in said second format from the first API to the logical locking function via the second API, the converted lock request including the first parameter and the second parameter, wherein the logical locking function responds to the sending of the converted lock request by initiating servicing of the requested lock; and
receiving an indication that a write following an optimistic read is to be a propagation from said optimistic read to an exclusive write.

2. The method of claim 1 wherein the received lock request in the first format comprises column names of said table.

3. The method of claim 1 wherein said receiving further comprises receiving a timeout value, said timeout value indicating an amount of time over which repeated attempts to lock said row of data may occur prior to an exception being thrown.

4. The method of claim 1 wherein said receiving further comprises receiving an indication that said data is to be unlocked synchronously with other locked data of a transaction in which said lock request played a part.

5. The method of claim 1 wherein said creating a first parameter further comprises receiving connection information from an SQL based database interface and combining it with said identifier of said table and said identifier of said first API, said connection information identifying a schema that has said table.

6. An article of manufacture including program code disposed on a computer readable storage medium which, when processed by a machine, causes the machine to perform a method, the method comprising:
receiving at a first application programming interface (API) a lock request requesting a lock and identifying an amount of data in a table of a database server for which the lock is requested, wherein said lock request is read lock request, the receiving including receiving an indication that said row of data is to be shared with other read locks during said read lock and that said read lock is to be optimistic, the lock request to be serviced by a logical locking function remote from a physical locking function of the database, the logical locking function including a second API, the lock request received at the first API in a first format including an identifier of the table and primary key information identifying a row of data in the table, the primary key information including values for each of two or more columns of the table, wherein the values are ordered according to a first order;
in response to the receiving the lock request, the first API converting said received lock request from the first format into a second format suitable for reception by the second API, said converting comprising:
creating a first parameter for said second format by combining an identifier of said first API and an identifier of said database table,
the first API retrieving from a database dictionary data describing a structure of the row of data, the retrieving based on the identifier of the table in the received lock request, and
creating a second parameter for said second format, the second parameter including the values for each of the two or more columns included in the received lock request, wherein the values for each of the two or more columns are reordered and concatenated in the second parameter according to a second order of the retrieved data describing the structure of the row of data, the second order different from the first order; and sending said converted lock request in said second format from the first API to the logical locking function via the second API, the converted lock request including the first parameter and the second parameter, wherein the logical locking function responds to the sending of the converted lock request by initiating servicing of the requested lock; and receiving an indication that a write following an optimistic read is to be a propagation from said optimistic read to an exclusive write.

7. The article of manufacture of claim 6 wherein the received lock request in the first format further comprises column names of said table.

8. The article of manufacture of claim 6 wherein said receiving further comprises receiving a timeout value, said timeout value indicating an amount of time over which repeated attempts to lock said row of data may occur prior to an exception being thrown.

9. The article of manufacture of claim 6 wherein said receiving further comprises receiving an indication that said data is to be unlocked synchronously with other locked data of a transaction in which said lock request played a part.

10. The article of manufacture of claim 6 wherein said creating a first parameter further comprises receiving connection information from an SQL based database interface and combining it with said identifier of said table and said identifier of said first API, said connection information identifying a schema that has said table.

* * * * *